Figure 1:
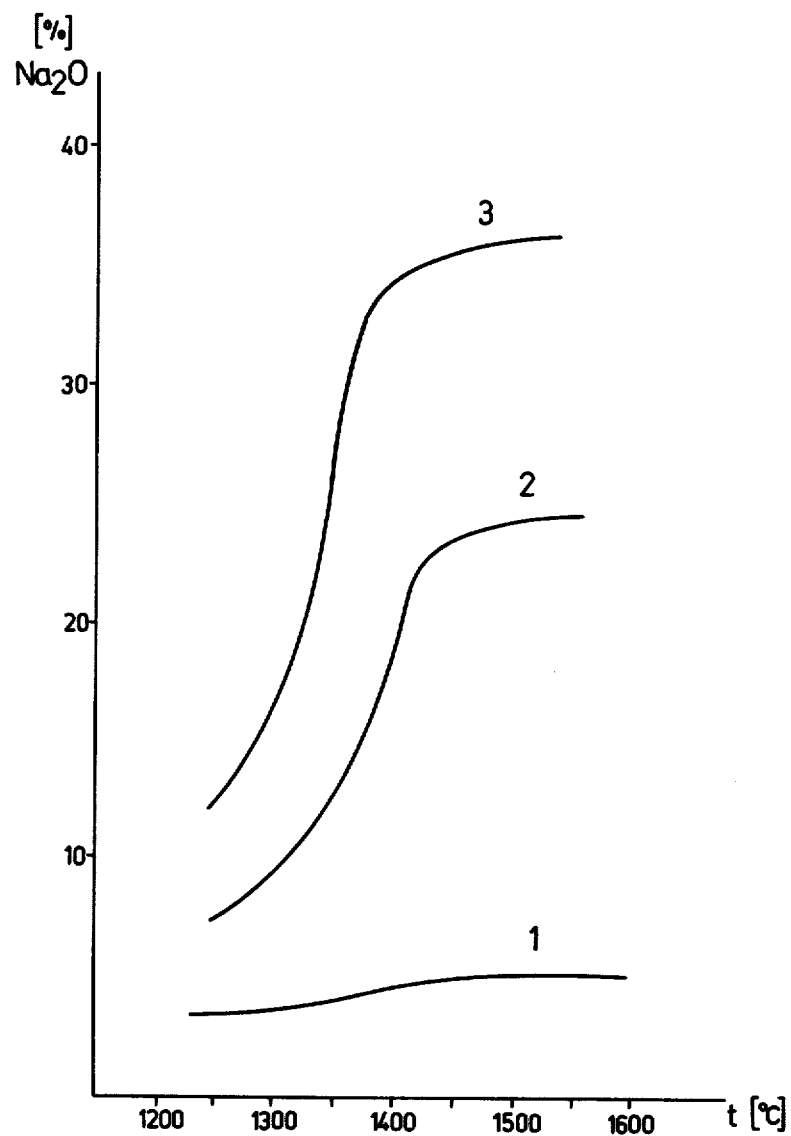

United States Patent

Horváth et al.

[11] 3,876,749
[45] Apr. 8, 1975

[54] METHOD FOR THE REDUCTION TREATMENT OF RED MUD

[75] Inventors: Gyulá Horváth; Zoltan Felföldi; Zoltán Oswald; Károly Solymár; Ádám Juhász; György Dobos; György Kaptay, all of Budapest, Hungary

[73] Assignee: Aluminiumipari Troszt, Budapest, Hungary

[22] Filed: Apr. 10, 1972

[21] Appl. No.: 242,495

[30] Foreign Application Priority Data
Apr. 17, 1971 Hungary .......................... MA 2220

[52] U.S. Cl. ................ 423/119; 423/137; 423/131; 423/331; 75/30
[51] Int. Cl. ............................................ C01f 7/04
[58] Field of Search .......... 423/119, 121, 137, 115, 423/131; 75/30

[56] References Cited
UNITED STATES PATENTS

| | | | |
|---|---|---|---|
| 1,422,004 | 7/1922 | Sherwin .............................. | 423/121 |
| 2,248,826 | 7/1941 | Seailles et al. .................. | 423/625 X |
| 2,356,626 | 8/1944 | Seailles ............................. | 423/119 |
| 3,295,924 | 1/1967 | Colombo ........................ | 423/121 X |

OTHER PUBLICATIONS

"Stahl Und Eisen," Vol. 90, No. 10, pages 544–545, (May 14, 1970).

*Primary Examiner*—Herbert T. Carter

[57] ABSTRACT

The red mud by-product of the Bayer aluminum manufacturing process is utilized by mixing the red mud with a reducing agent, reducing the red mud, separating it into molten steel and molten slag, reacting the slag with CaO, leaching out the useful aluminates for recirculation to the Bayer process, and utilizing the remaining calcium silicates in cement manufacture.

9 Claims, 3 Drawing Figures

METHOD FOR THE REDUCTION TREATMENT OF RED MUD

The present invention relates to a method for the processing of red mud, more particularly the present invention relates to a method for the reduction treatment of red mud obtained in the Bayer aluminum manufacturing process, to recover its aluminum, iron, and sodium content.

Typically, in the Bayer process of manufacturing of aluminum bauxite is used which is an iron and silica-containing aluminum hydroxide mineral. The bauxite is usually decomposed by heating with concentrated caustic soda under pressure, or by melting with sodium carbonate, whereby alumina is dissolved from the bauxite to form sodium aluminate, leaving behind an iron residue with a large proportion of sodium aluminate silicate. This residue is the red mud byproduct hereinafter referred to in the specification and the claims as "red mud."

Raw steel can be recovered from red mud by a number of prior art processes. For example, it is known to subject the red mud to reduction in a rotary kiln and then to melt the resulting product and to recover the steel from the melt. However, recovery of the $Al_2O_3$ and the $Na_2O$ content of the remaining slag is not made possible by the known processes. (Stahl and Eisen, Vol. 90, No. 10, May 14, 1970, pp. 544–545). The recovery of the aluminum and sodium content of the red mud is not economically feasible by the use of the known processes, because during the reduction of the red mud its sodium aluminum silicates decompose in the presence of the reducing agent, their sodium content vaporizes and can be only uneconomically recovered from the combustion gases and then only as sodium sulfate or as sodium carbonate.

It is the aim of the process of the present invention to maximize the recovery of all useful components of the complex red mud by-product, while avoiding the loss of any sodium during the conversion of the $Na_2O$ content of the molten slag into a sodium aluminate which can be directly leached out, carrying out the process under conditions consistent with a rational thermal balance, and avoiding the formation of products which can stick to parts of the processing equipment.

The process of the present invention involves melting of the red mud under reducing circumstances, separating the molten steel from the molten slag and adding to each part by weight of the slag from about 0.4 parts by weight to about 1.5 parts by weight of burnt lime. As used in the specification and the claims, any reference to burnt lime is intended alternatively to include stoichiometrically corresponding amounts of limestone or other CaO-containing materials or stoichiometrically corresponding mixtures thereof. A reaction takes place between the slag and the CaO between 1,000°C and 1,600°C.

The process of the present invention is based on the discovery that the sodium aluminum silicates which are to be found in red mud, will decompose even in the presence of a reducing agent, to any appreciable extent only if there is also present some CaO which will promote such a decomposition. If there is no CaO present then even when the red mud is melted at 1,500°–1,600°C no appreciable loss in $Na_2O$ occurs, because the nepheline or carnegierite that are formed are crystalline forms that are very stable up to those higher temperatures at which the separation of the molten steel from the slag will occur quite readily. Thus, in a reducing atmosphere the sodium content of the red mud is lost in the case of the known processes.

Figure 2:
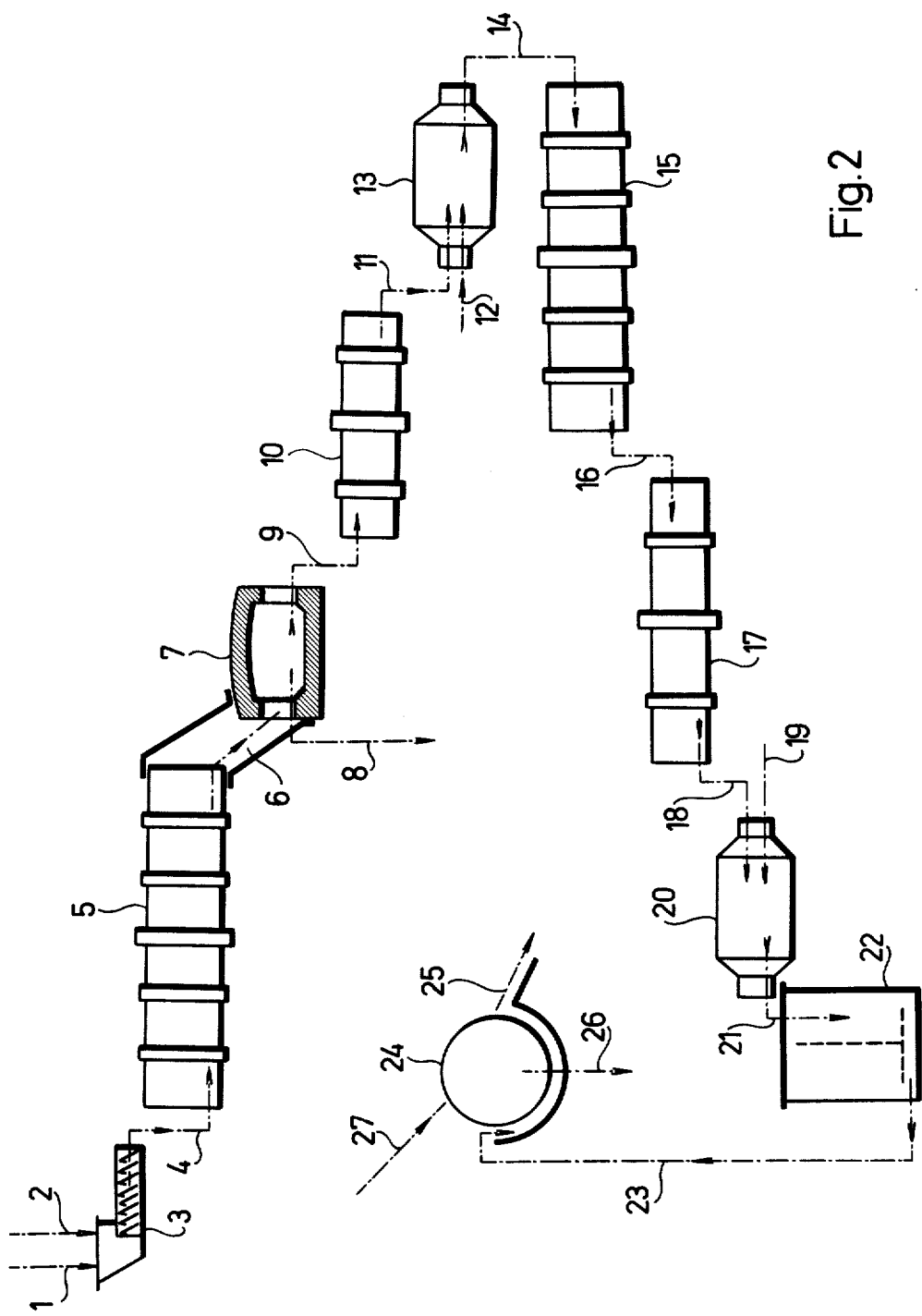
Figure 3:
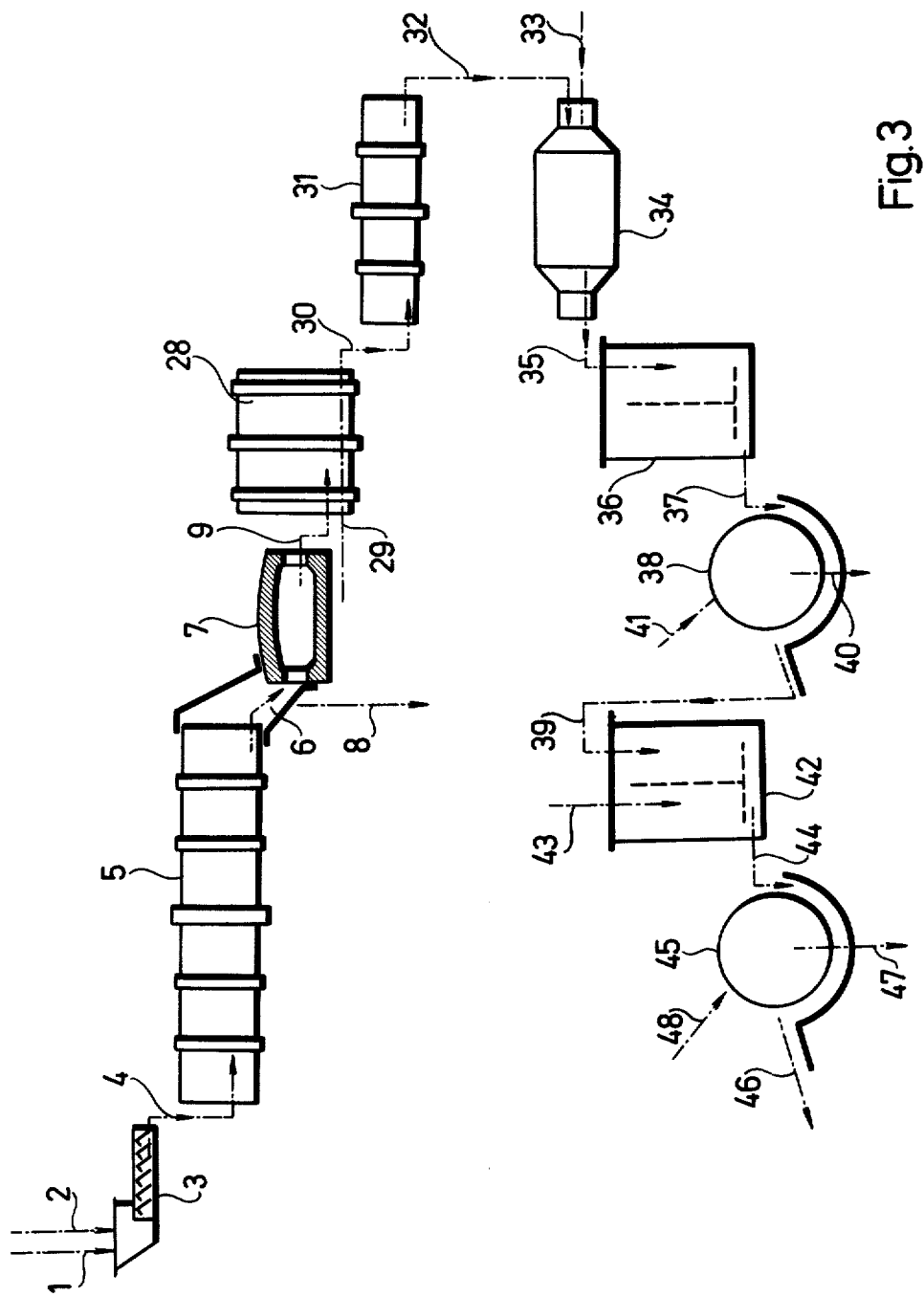

The present invention is disclosed in greater detail in the following part of the specification, with reference being had to the accompanying drawing, wherein FIG. 1 is a graph showing loss of $Na_2O$ as a function of temperature and CaO content of the slag, and FIGS. 2 and 3 are respectively flow diagrams of different embodiments of the process of the present invention.

FIG. 1 shows the loss of $Na_2O$ during 60 minute exposures to various temperatures for red mud with various amounts of CaO content. The abscissa values represent temperature and the ordinate shows the $Na_2O$ loss based on its content in the starting material. Curve 1 corresponds to a 3.7% CaO content, curve 2 to 8.2% CaO, and curve 3 to 13.5% CaO. As shown by X-ray diffraction determinations in connection with the reduction of the sodium aluminum silicate phase (nepheline or carnegierite) that this reduction is proportionate to the loss of $Na_2O$ which is brought about by its vaporization due to the addition of CaO.

After the addition of CaO resulted in a proportionate loss of $Na_2O$, a further increase of the temperature will not result in any appreciable change in the composition of the slag-melt system, as shown by the leveling off of the curves. On the basis of the results shown in FIG. 1 it becomes clear that when the addition of CaO is increased up to or past the amounts required for the formation of dicalcium silicate, the Nahd 2O contained in the sodium aluminum silicates will become lost practically in its entirety. In carrying out the process of the present invention, the foregoing circumstance requires that the CaO addition to the molten slag be carried out in a neutral or oxidizing atmosphere.

It is desirable that in the formation of the molten steel and slag continuous operation should not be hindered by the formation of rings during the softening or melting of the material, which adhere to the walls of the equipment. This can be suitably avoided by carrying it out in two kilns which are connected in series. The first kiln, suitably a rotary kiln, serves for the reduction of the red mud, and the second kiln, suitably an open flame furnace, serves for the separation of the molten phases of the red mud. The red mud in the first kiln is heated suitably only near to its softening point. The two kilns connected in series are suitably connected into a single thermal system for caloric economy. The walls of the melting furnace are suitably lined with a basic refractory such as magnesite, dolomite or chromium magnesite, built suitably on a firebrick base.

In red mud the molar ratio of $Na_2O$ and $Al_2O_3$ generally corresponds to the composition of sodium aluminate. When not more than up to about 1–2% (wt) CaO is present in the red mud, then the ratio of mols of $Na_2O$ to the mols of $Al_2O_3$ remains substantially unchanged during melting, therefore, according to another embodiment of the present invention the cooled off nepheline-type slag can be sintered with burnt lime alone, without the addition of any sodium-containing ingredient. In this case the sintering can be carried out between about 1,000°C and about 1,400°C.

According to another embodiment of the present invention suitably preheated burnt lime is added still to the molten slag, in amounts to promote the formation of $Ca_2SiO_4$ and of $CaTiO_3$ together with the formation of NaAlO$_2$. This embodiment of the present invention allows the utilization of the heat content of the molten slag, thus materially reducing the caloric requirements compared to those of the above-mentioned separate sintering process. In practice, the slag is removed from the melting furnace, the possible reducing material content of the slag is pyrolized to reduce any sodium losses which may occur when CaO is added to the slag, and then adding the stoichiometrically required amount of burnt lime. Suitably a slight excess of burnt lime can be used so that if there is a slight loss of sodium vapors and there would be an insufficient amount of sodium present for the conversion of the entire alumina content of the slag into sodium aluminate, the remaining alumina can then be converted into calcium aluminate by the utilization of such excess calcium.

If an insufficient amount of CaO is present, then not only the formation of NaAlO$_3$, Na$_2$Al$_2$O$_4$ and Ca$_2$SiO$_4$ can be expected, but also of various calcium aluminates, including Na$_4$Ca$_3$(AlO$_2$)$_{10}$; 2 Na$_2$O.3 CaO.5 Al$_2$O$_3$; Ca$_2$Al$_3$Si$_3$O$_{12}$(OH); Ca$_2$Al$_2$SiO$_7$; Ca$_3$Al$_2$O$_6$; and Ca$_3$Al$_{10}$O$_{18}$. The solubility of these calcium aluminates in basic solvents such as caustic aluminate or sodium carbonate is quite varied and their presence generally results in a reduction in the recovery of Al$_2$O$_3$ and of Na$_2$O. Hence, the objective is to maximize the formation of sodium aluminate, dicalcium silicate and of perovskite (CaTiO$_3$).

Since, however, the formation of various calcium aluminates may not be entirely avoided, the slag is suitably leached out in two steps. In the first step the NaAlO$_2$ content of the slag is leached out with a basic solvent, and in the second step the calcium aluminates are leached out with a sodium carbonate solution. The mud remaining after leaching can be utilized in the manufacture of cement.

In the embodiment of the process of the present invention shown in FIG. 2, the red mud 1 which contains not more than 10% (wt) CaO, is mixed with the reducing agent 2 in a mixing feeder 3. The reducing agent, such as anthracite, suitably has a particle size under 3mm. The homogenized mixture 4 is fed from the mixing feeder 3, into a rotary kiln 5 for reduction. Here the material is heated to about 1,000°C and its iron oxide content becomes reduced to metallic iron with a conversion efficiency of about 80–90%. The reduced material 6 is transferred in a closed system into a melting furnace 7 which is suitably fired with oil or natural gas the combustion gases of which are suitably utilized for the heating of the reduction kiln 5. Thus the heat of combustion of the solid reducing agent 2, together with the hot combustion gases from the melting furnace 7 may be sufficient to require the introduction of only a small amount of additional external heat.

The reduced material separates in the melting furnace 7 into molten steel 8 and molten slag 9, which are both continuously or periodically tapped. The molten steel 8 can be further treated, such as by desulfurizing, before utilization. The molten slag 9 is cooled, suitably in a rotary cooler 10, such as by sprinkling with water and, thereafter, the solidified slag 11 is mixed and ground with crushed burnt lime in a mill 13 to a maximum particle size suitably of 0.1mm.

The burnt lime is mixed with the slag in molar proportions (with a tolerance of about ± 10%) corresponding to CaO:SiO$_2$=2; CaO:TiO$_2$=1 and CaO:Fe$_2$O$_3$=2. The slag-CaO mixture 14 is introduced into a sintering furnace 15, in which the formation of sodium aluminate and of dicalcium silicate occurs between 1,000°C and 1,400°C. The sintered material 16 is cooled in a cooling drum 17 and the cooled product 18 is ground with sodium aluminate 19 obtained from the Bayer process, in a mill 20. The resulting slurry 21 is introduced into an agitator-equipped leaching vessel 22 to complete the dissolution of the sodium aluminate content of the slag. The slurry 23 which is obtained in the leaching vessel 22, is transferred into a vacuum filter 24 where the solid mud phase 25 is separated from the liquid phase 26 which contains the basic leaching solvent and the dissolved sodium aluminate. The mud 25 is washed in the filter 24 with a washing liquid such as water 27 and, if desired, the washwater is combined with the liquid phase 26. The liquid phase can then be returned to the Bayer process, while the dicalcium silicate mud 25 can be utilized in the manufacture of cement.

The embodiment of the process of the present invention, which is shown in FIG. 3 differs from the embodiment shown in FIG. 2 mainly in that molten slag is reacted with the burnt lime. Since the preparation, reduction and melting of the red mud are carried out substantially identically to the same steps of the embodiment shown in FIG. 2, the corresponding identical steps are referred to in FIG. 3 with the same reference numerals 1–9 as in FIG. 2. Subsequently to these identical initial steps, the molten slag 9 is transferred batchwise or continuously, into suitably several parallel arranged heated reactors 28 which are each equipped with stirring means. Here predetermined amounts of suitably preheated burnt lime 29 are added and the mixture is sintered between 1,000°C and 1,600°C.

The amounts of CaO are added to obtain the following molar ratios (with a ±10% tolerance): CaO:SiO$_2$=2, CaO:TiO$_2$=1; CaO:Fe$_2$O$_3$=2; and CaO:Al$_2$O$_3$=0.1–0.5.

The molten sintered matter 30 is then cooled in a drum 31 and the cooled matter 32 is mixed with a basic leaching solution 33 while being wet ground in a mill 34 to a maximum particle size of 1 mm. The resulting slurry 35 is transferred to a leaching tank 36 where the leaching out of the sodium aluminate content of the solid matter is completed. The resulting slurry 37 is separated with a vacuum filter 38 into a solid mud phase 39 and a basic liquid phase 40. The mud phase 39 is washed with water 41. Subsequently the mud 39 is introduced into a second leaching tank 42 in which a sodium carbonate solution 43 is utilized to leach out calcium aluminates. After this second leaching the resulting slurry 44 is separated on a vacuum filter 45 into a mud phase 46 and a liquor phase 47. After washing with water 48, the mud phase 46 can be utilized in the manufacture of cement. The aluminate liquors 40 and 47 are introduced —suitably separately— into the Bayer process.

The following detailed examples are further illustrative disclosures of embodiments, setting forth best modes contemplated for carrying out the present invention. Parts and percentages are by weight.

EXAMPLE 1

Red mud is processed in accordance with the steps shown in FIG. 2. The red mud contains 30% moisture. A mixture of red mud is prepared with 20% —dry basis— of anthracite having a maximum particle size of 3 mm.

After reduction at up to 1,500°C, the resulting material is melted and the melt is separated into molten slag and molten steel. The starting red mud composition and the composition of the slag (also containing the ashes of the reducing agent) are given in Table I.

Table I

| Component | in red mud % | in slag % |
| --- | --- | --- |
| $Al_2O_3$ | 16.0 | 30.8 |
| $SiO_2$ | 13.7 | 29.4 |
| $Fe_2O_3$ | 39.0 | 2.5 |
| $TiO_2$ | 5.2 | 9.5 |
| $Na_2O$ | 10.6 | 18.9 |
| CaO | 2.0 | 4.0 |
| MgO | 1.0 | 1.8 |
| ignition loss | 9.9 | 0.2 |
| other | 2.6 | 2.9 |

On the basis of the data in Table I it can be seen that the molten steel phase contains 96.5% of the iron content of the starting material while only about 2% of the $Na_2O$ content of the starting material vaporized during the reduction. The remaining $Na_2O$ content of the slag is sufficient for entirely converting the $Al_2O_3$ content of the slag into sodium aluminate.

1.06 parts of burnt lime is added to each part of the ground slag and after sintering at 1,200°C in a rotary kiln, the resulting product is leached in a basic sodium aluminate solution containing 60 g/liter as $Na_2O$ and 28 g/liter as $Al_2O_3$. After separation of the liquid and solid phases, the latter has the composition shown in Table II along with the composition of the sintered product before leaching.

Thus 85% of the $Al_2O_3$ and 90% of the $Na_2O$ content of the starting red mud composition is recovered.

EXAMPLE 2

The red mud as used in Example 1 is processed in accordance with the steps shown in FIG. 3 to obtain a slag having the same composition as shown in Table I.

Table II

| Component | in sintered material % | in residue % |
| --- | --- | --- |
| $Al_2O_3$ | 19.3 | 3.9 |
| $SiO_2$ | 18.5 | 24.9 |
| $Fe_2O_3$ | 1.6 | 2.1 |
| $TiO_2$ | 6.0 | 8.0 |
| $Na_2O$ | 11.0 | 1.6 |
| CaO | 39.7 | 53.2 |
| MgO | 1.1 | 1.5 |
| Ignition loss | — | 2.1 |
| other | 2.0 | 2.7 |

0.625 parts of preheated, crushed burnt lime is added to each part of the molten slag. After sintering, the composition of the sintered material is shown in Table III. The sintered material is subsequently leached in two steps, first in a basic sodium aluminate solution as in Example 1 and then in a 40 g/liter sodium carbonate and sodium aluminate solution, the latter containing 20 g/liter as NaOH and 10 g/liter as $Al_2O_3$. The compositions of the mud phases after each leaching step are also shown in Table III.

Table III

| Component | after sintering | 1st leaching | 2nd leaching |
| --- | --- | --- | --- |
| $Al_2O_3$ | 19.2 | 7.3 | 4.9 |
| $SiO_2$ | 18.3 | 23.1 | 23.1 |
| $Fe_2O_3$ | 1.6 | 2.0 | 2.0 |
| $TiO_2$ | 5.9 | 7.4 | 7.4 |
| $Na_2O$ | 10.6 | 2.3 | 2.3 |
| CaO | 41.5 | 52.4 | 52.4 |
| MgO | 1.1 | 1.4 | 1.4 |
| Ignition loss | — | 1.9 | 2.4 |
| other | 1.8 | 2.2 | 4.1 |

After the second leaching step, 79.8% of the $Al_2O_3$ and 72.8% of the $Na_2O$ of the starting red mud is recovered. As it can be seen a 10% $Na_2O$ loss occurs during the treatment of the molten slag and the $Al_2O_3$ yield is about 70% in the first leaching step, which increases in the second leaching to 79.8% due to the dissolution of the calcium aluminates.

We claim:

1. In a process for the treatment of the red mud by-product of the Bayer aluminum manufacturing process, wherein a reducing agent is added to the red mud and a calcareous material is employed, and the mixture is melted under reducing conditions and the melt is separated into a steel phase and a slag phase, and aluminum values are recovered from the slag phase, and the slag phase after processing is cooled, the cooled product is leached, and the resulting liquid and solid phases are separated, the improvement which comprises carrying out said melting without the prior addition of a calcareous material to the red mud, adding a calcareous material to the slag phase material in a concentration to provide, together with the CaO content of the slag phase, the following molar ratios, within ± 10%, with the $SiO_2$, $TiO_2$, $Fe_2O_3$ and $Al_2O_3$ content of the slag phase $CaO:SiO_2=2$; $CaO:tiO_2=1$; $CaO:Fe_2O_3=2$; and $CaO:Al_2O_3=0.1 - 0.5$, and then heating the resulting mixture at a temperature from about 1,000°C to about 1,600°C in a substantially neutral or oxidizing atmosphere, whereby the sodium aluminate formed during said heating becomes soluble for subsequent recovery.

2. The improvement of the process of claim 1, further comprising the step of grinding the cooled product to a maximum particle size of 1 mm before the leaching thereof.

3. The improvement of the process of claim 2, further comprising the step of cooling the slag phase before contacting it with the calcareous material, then grinding the mixture and then sintering it at a temperature between 1,000°C and 1,600°C before said steps of cooling, grinding, and leaching.

4. The improvement of the process of claim 3, wherein the said step of sintering is carried out at a temperature between 1,100°C and 1,400°C.

5. The improvement of the process of claim 2, wherein said step of contacting with calcareous material is carried out while the slag phase is still substantially molten.

6. The improvement of the process of claim 5, wherein the substantially molten slag is contacted with preheated burnt lime.

7. The improvement of the process of claim 6, wherein the amount of burnt lime added to the slag is slightly in excess of the amount of CaO stoichiometrically required on the basis of the sodium content of the slag for decomposing the sodium silicate content of the slag thereby to form calcium silicate.

8. The improvement of the process of claim 2, wherein said step of leaching comprises a first leaching with a basic caustic solvent substantially to remove the sodium aluminate content of the slag phase, and a second leaching with a sodium carbonate solvent substantially to remove the calcium aluminate content of the slag phase.

9. The improvement of the process of claim 8, wherein the caustic solvent for said first leaching is a sodium aluminate solvent.

* * * * *